May 12, 1925.
F. B. LEOPOLD
DRY FEED MACHINE
Filed June 28, 1923
1,537,123
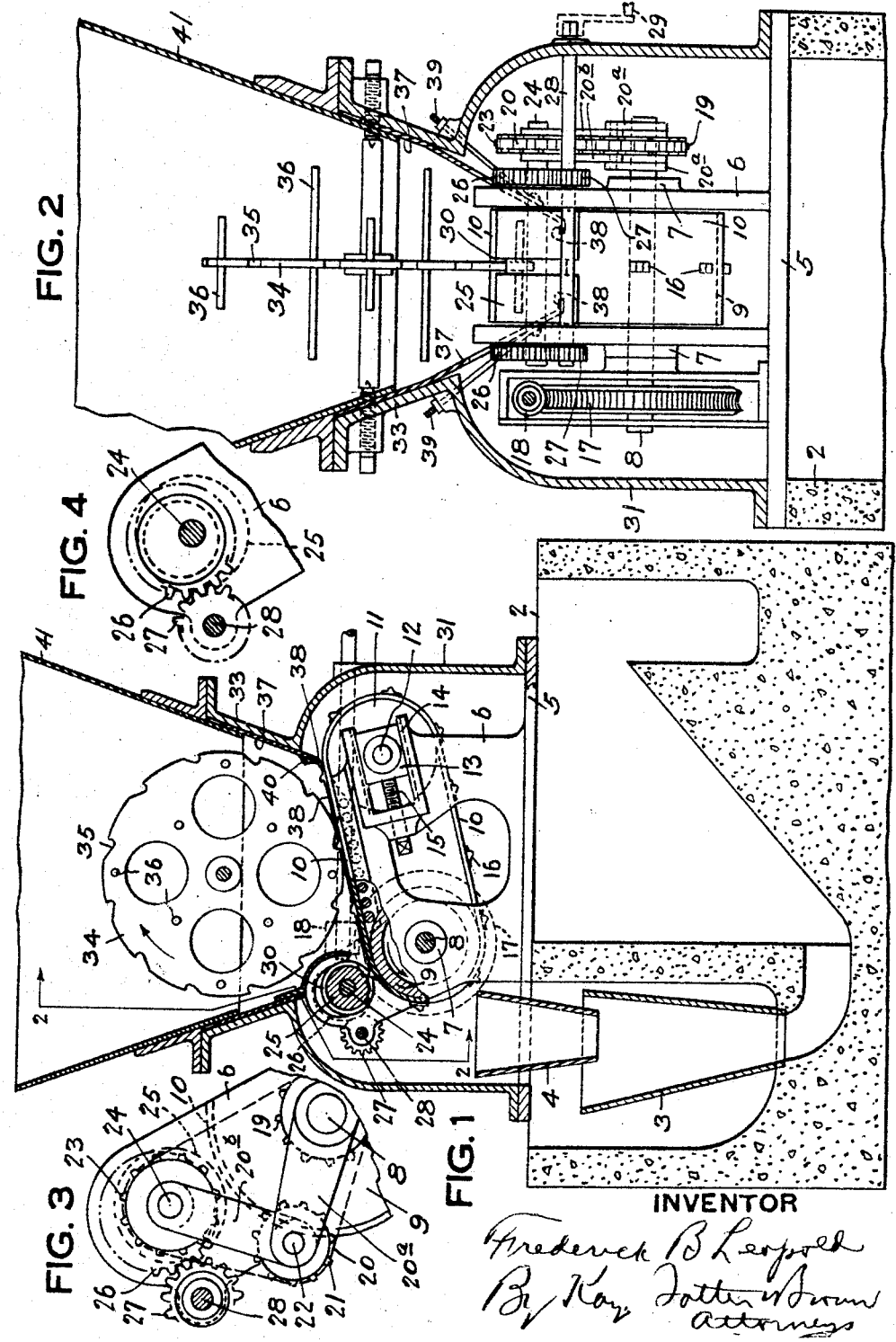

Patented May 12, 1925.

1,537,123

UNITED STATES PATENT OFFICE.

FREDERICK B. LEOPOLD, OF PITTSBURGH, PENNSYLVANIA.

DRY-FEED MACHINE.

Application filed June 28, 1923. Serial No. 648,405.

*To all whom it may concern:*

Be it known that I, FREDERICK B. LEOPOLD, a citizen of the United States, and resident of Pittsburgh, in the county of Allegheny and State of Pennsylvania, have invented a new and useful Improvement in Dry-Feed Machines; and I do hereby declare the following to be a full, clear, and exact description thereof.

My invention relates to a dry-feed machine primarily designed for feeding in a dry granular, powdered or crystallized form, material used for adding chemicals for treating water for filtration or other purification plants in a predetermined quantity, although the machine may be used for any purpose of similar character where accurate measurements and delivery of suitable material are required.

The majority of machines now in use are made to feed either by a screw movement inside of a bin, by dropping the material on a revolving plate and scraping it off, or by using a single revolving wheel. The revolving plate method is inaccurate and the act of scraping the plate itself produces friction which tends to solidify and crystallize some materials, making frequent cleaning of the machine necessary. The same objection applies to the screw-feed, with the additional one that the screw does not move the material uniformly to the discharge opening. The single wheel so far has given the most satisfactory results of any, but the contact with the material is inadequate in many cases to give a uniform feed, as the narrow opening in the bottom of the hopper tends to increase the natural tendency of certain material to bridge, allowing the machine to operate without feeding.

The object of my invention is to overcome these objections above enumerated which accompany the use of the above machines, and to provide a machine of greater accuracy, greater simplicity, and capable of being set either by hand or operated proportionately to the flow of water or fluid from another source.

In the accompanying drawing, Fig. 1 is a side elevation in section of my improved machine; Fig. 2 is a face view showing the hopper broken away to show the agitator; Figs. 3 and 4 are enlarged details of the feed roll operating mechanism.

As my machine is particularly adapted for use in feeding material in connection with the treating of water for filtration or other purification plants, the drawing illustrates the invention as applied to such use. Accordingly, the numeral 2 designates a concrete mixing reservoir of the ordinary type used in connection with filtration plants, the material being delivered to said reservoir by the hoppers 3 and 4.

Mounted on the concrete mixing reservoir 2 is a base-plate 5 with the frame 6 cast integral therewith. Mounted in suitable bearings 7 in the frame 6 is the shaft 8. Mounted on the shaft 8 is the drum 9 to receive the endless-belt 10 which also passes around the drum 11 mounted on shaft 12. The shaft 12 is mounted in sliding journal-boxes 13 mounted in guides 14, and said journal-boxes are adjusted by means of the screw 15 to take up any slack in the belt 10.

At intervals on the belt 10 are the lugs 16 for the purpose hereinafter more fully set forth.

Mounted on the shaft 8 is the large worm-gear 17 which is driven by the worm 18 connected up to any suitable motor.

Mounted on the shaft 8 is the sprocket wheel 19, chain 20 engages said sprocket-wheel and passes around the sprocket-wheel 21 on the shaft 22 and around the sprocket-wheel 23 on the shaft 24. The shaft 24 carries a rotatable feed-roll 25.

The ends of the shaft 24 are journaled in gears 26, said gears being journaled in the frame 6. The roll-shaft 24 is journaled eccentrically to the axis of the gears to permit of adjustment of said roll to and from the belt 10, as will more fully hereinafter appear. Provision must be made for taking up the chain 20 when the roll 25 is adjusted, and accordingly toggle-arms 20$^a$ and 20$^b$ are employed, the toggle-arms 20$^a$ connecting the shafts 8 and 22, and the arms 20$^b$ connecting the shafts 22 and 24.

To provide for this adjustment, pinions 27 mesh with the gears 26, said pinions being mounted on the shaft 28 adapted to be operated by the handle 29.

The roll 25 has an annular groove 30 formed therein to permit of the passage of the lugs 16 on the belt 10.

The above described apparatus is enclosed by the casing 31, said casing being provided with a hopper-like portion 33 in which is mounted the disc 34 with the notches 35 formed at regular intervals on its periphery, said notches being adapted to be engaged by the lugs 16 on the belt 10 whereby intermittent rotary movement is imparted to the disc 34.

The disc 34 is provided with agitators 36 which act to keep the material stirred up, and in condition to feed uniformly to the belt 10.

In order to prevent the material escaping from the hopper into the casing 31, and to insure against the material adhering to the sides of said hopper, I provide loose fitting telescoping members 37 arranged on all four sides of the hopper portion 32, the lower ends of said telescoping members being bent at 38 to rest lightly on the belt 10 or very close thereto, so that the material will rest on said bent portions. Adjusting screws 39 are connected to the telescoping members 37 to provide for adjusting said members with relation to the belt 10 so as to prevent the material working out into the casing, and at the same time to prevent undue friction by weight of the material.

In operation the slight contact of the telescoping members on the belt will result in a continuous vibration that will prevent the adhering of the contained material to the sides thereof and prevent bridging.

The telescoping members 37 at the ends of the belt 10 have the ends 38 hinged as at 40 to permit of the passage of the lugs 16 under said telescoping members without interference.

A hopper 41 fits in the upper end of the hopper member 32 of the casing 31, the lower end of said hopper projecting over the upper end of the telescoping members 37 without interfering with the movement of the telescoping members when adjustment of same is required.

The material to be fed is delivered into the hopper 41 and when the power is applied the belt 10 will be driven, and as said belt moves the lugs 16 will engage the notches 35 in the disc 34 and the agitators will be operated to keep the material in condition for being fed to the belt 10. The feed of the material is regulated by the speed of the travel of the belt, and by the opening formed by the measuring-roll 25. This roll is adjusted by means of the shaft 28 to give any desired opening, and as said roll is mounted eccentrically in the gears 26, the distance of said roll from the belt 10 is controlled by the position of said gears, and as a consequence a regular and uniform amount of material is fed into the hopper 4 at every revolution of the measuring-roll 25.

The employment of the endless belt, which moves continuously to prevent the bridging of material, insures the positive discharge of the material with uniformity and accuracy, while at the same time the headroom is reduced, so that the apparatus may be set up where the space is limited.

I claim as my invention:

1. In a machine of the character described the combination with a suitable hopper, of an endless belt below said hopper, means for driving said belt, a measuring device at the discharge end of said belt, plates engaging said hopper and contiguous to said belt, and means for adjusting said plates to and from said belt.

2. In a machine of the character described the combination with a suitable hopper, of a movable telescoping member at the lower end thereof, an endless belt below said hopper, means for driving said belt, and a measuring device at the discharge end of said belt whereby the amount of material delivered by said belt may be accurately measured.

3. In a machine of the character described the combination with a suitable hopper, of an endless belt below said hopper, means for driving said belt, a radially adjustable and rotatable feed roll at the discharge end of said belt, and means for rotating said roll during movement of said belt.

4. In a machine of the character described the combination with a suitable hopper, of an inclined endless belt below said hopper, means for driving said belt, a feed-roll at the lower end of said belt, means for adjusting said roll to and from said belt, and a driving connection between said driving means and the roll for driving said roll in a direction reverse to that of the belt.

5. In a machine of the character described the combination with a suitable hopper, of an endless belt below said hopper, means for driving said belt, a feed roll at the discharge end of said belt, gears, said roll being eccentrically journaled in said gears, pinions engaging said gears, means for operating said pinions to shift said gears, and means controlled by movement of the belt for rotating said roll with respect to said gears.

6. In a machine of the character described the combination with a suitable hopper, of an endless material receiving belt below said roll, a feed roll at the discharge end of said belt and journaled in gears, means for shifting said gears, a sprocket wheel on said roll, a shaft for driving said belt, a sprocket wheel on said shaft, a countershaft, a sprocket wheel on said countershaft, a drive chain engaging said sprocket wheels, and toggle arms connecting said shafts and said roll.

In testimony whereof I, the said FREDERICK B. LEOPOLD, have hereunto set my hand.

FREDERICK B. LEOPOLD.